R. MALCOM.
EYE SHIELD.
APPLICATION FILED MAR. 5, 1910.
988,005.
Patented Mar. 28, 1911.
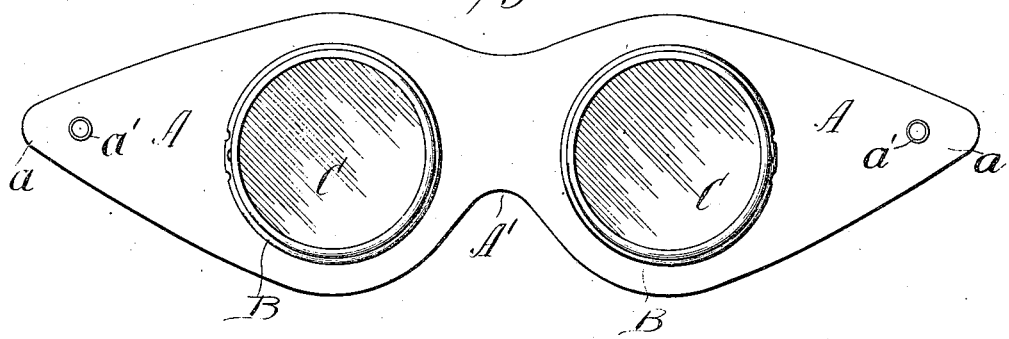
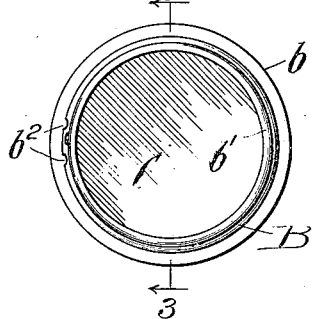
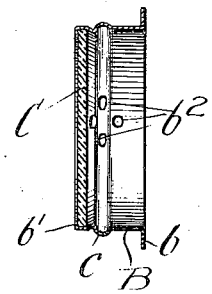
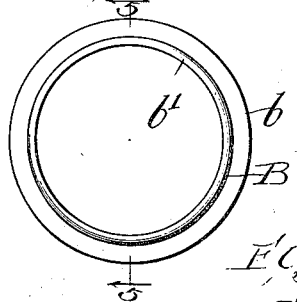
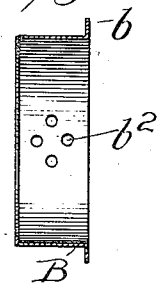
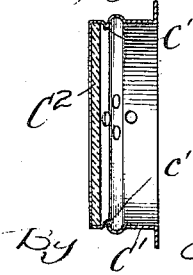
Witnesses:
R. A. White.
H. C. L. White.
Inventor:
Robert Malcom,
By Frank King Atty.

UNITED STATES PATENT OFFICE.

ROBERT MALCOM, OF CHICAGO, ILLINOIS.

EYE-SHIELD.

988,005.  Specification of Letters Patent.  Patented Mar. 28, 1911.

Application filed March 5, 1910. Serial No. 547,492.

*To all whom it may concern:*

Be it known that I, ROBERT MALCOM, a citizen of the United States, residing at Chicago, in the county of Cook and State of Illinois, have invented certain new and useful Improvements in Eye-Shields, of which the following, taken in connection with the drawing, is a description.

My invention has for its object the production of an eye shield designed to be used by workmen and others who are exposed to dust, dirt, cinders, etc.

A further object of the invention is to provide an eye shield which may be folded into small space, by providing a frame of flexible material which is so constructed that it may be folded at the center thereof. This frame is designed to fit closely to the features of the face, and is provided with separate lens holding frames which stand out from the eyes.

Other objects and advantages will be hereinafter more clearly explained and pointed out in the claim.

In the drawings, forming part of this specification, and in which like letters of reference indicate corresponding parts, I have illustrated one form of device embodying the essential features of my invention, although the same may be carried into effect in other ways without in the least departing from the spirit of my invention and in these drawings—

Figure 1 is a plan view of the eye shield; Fig. 2 is a plan view of the lens and lens holding frame removed from the flexible frame; Fig. 3 is a sectional view of the lens holding frame taken on line 3—3 of Fig. 2; Fig. 4 is a plan view of the lens holding frame before the lens is inserted therein; Fig. 5 is a sectional view taken on line 5—5 of Fig. 4; and Fig. 6 is a sectional view of a slightly modified form of lens holding frame.

In the drawings A, Fig. 1, is the outer flexible frame of the eye shield, which may be of any suitable material, such as leather, or the like. This frame is provided with apertures cut therethrough into which lens holding frames are arranged. A recess A' is formed in the center of this frame to fit over the nose of the wearer, and the projecting ends of the frame $a$, $a$ are provided with eyelets $a'$, $a'$ into which is secured a cord or tape which extends around the head of the wearer.

B, B are the lens holding frames, which are preferably made of metal of any size and shape desired. In this instance, I have shown a round lens holding frame, which is formed with an outwardly extending rim or flange $b$ upon one peripheral edge thereof and an inwardly extending flange $b'$ from the opposite peripheral edge thereof. These lens holding frames are preferably made of metal, and are provided with a plurality of ventilating apertures $b^2$ in the sides thereof.

In the construction of the frames the flanges $b$, $b'$ are formed thereon, and the lens C, which may be of glass, mica, celluloid, or other transparent material, is placed in the frame from the inside thereof and rests against the flange $b'$. The frame B is then placed into rollers and the circumferential bead $c$ formed in the periphery of the metal frame, in which operation the metal is bent slightly under the glass lens and the bead surrounds the frame between the lens and the flange $b$. The bending of the metal inwardly has formed a seat for the lens as shown more particularly in Fig. 3, which prevents any accidental displacement of the lens. A pair of these lens holding frames is inserted through the apertures in the flexible frame A, the frame itself being sufficiently flexible to permit the metal frames to be inserted through the apertures and to be held in place by frictional contact, the rim or flange $b$ resting against the frame A upon the inside thereof and the bead $c$ preventing accidental displacement in the opposite direction. These lens frames may be removed from the flexible frame A if desired and others inserted in their places in case of accident or if desired to replace with different colored lenses.

In Fig. 6 I have shown a slightly modified form of lens holding frame in which slight indentations $c'$ are made in the periphery of the frame C' upon the inside of the lens $C^2$.

I claim:—

An eye shield comprising a flexible body adapted to fit closely to the face of the wearer and provided with a pair of apertures, lenses, annular lens holding frames therefor extending through said apertures and provided at their inner ends with outwardly-extending flanges abutting against the inner face of said body, said frames projecting forwardly from the outer face of said body and each of said frames having an inner diameter at least as great as the lens carried thereby to permit of the insertion of the lens therein from rear to front thereof and further having at its outer terminus an inwardly-extending annular flange against the inner face of which is adapted to abut the lens, and each of said frames furthermore provided with a beading at a point removed from its inwardly-extending flange thereby forming an inwardly extending annular clamping portion engaging the rear face of the lens for fixedly securing the lens in position at the outer end of the frame.

In testimony whereof, I have signed this specification in the presence of two subscribing witnesses.

ROBERT MALCOM.

Witnesses:
A. V. WELDON,
CHARLES I. COBB.